United States Patent Office 2,941,563
Patented June 21, 1960

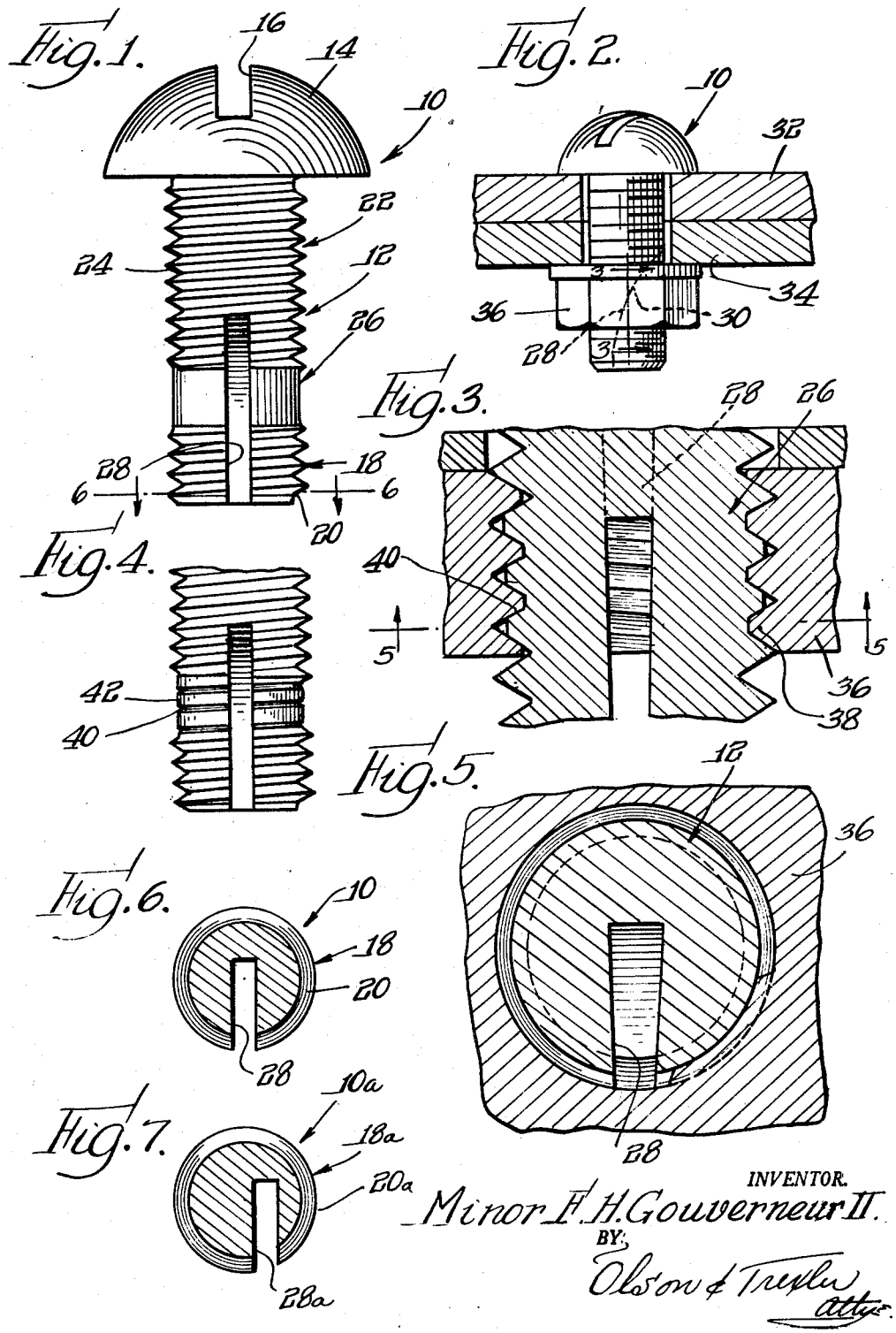

2,941,563

SLOTTED SCREW WITH UNTHREADED INTERMEDIATE LOCKING PORTION

Minor F. H. Gouverneur II, Wheaton, Ill., assignor to Illinois Tool Works, Chicago, Ill., a corporation of Illinois Filed Oct. 22, 1956, Ser. No. 617,549

3 Claims. (Cl. 151—14)

The present invention relates to novel fastening devices, and more particularly to novel self-locking threaded fastening devices such as screws and the like.

Locking screws and the like have heretofore been suggested which include an insert of fiber or plastic or some other suitable material, and it has also been suggested that an oversized screw which is threaded throughout its length be formed that it may be collapsed upon application to a nut or other complementary member and subsequently provide a locking action. While these prior proposals have been satisfactory for many purposes, it will be appreciated that locking screws requiring inserts are relatively difficult and expensive to manufacture and prior proposed slotted oversized locking screws are frequently relatively difficult to apply to a nut and do not provide sufficient locking action for certain installations.

It is an important object of the present invention to provide a novel one-piece self-locking threaded fastener element such as a screw or the like which may be easily and economically produced and which may be readily assembled with a complementary member and is constructed so as to provide a substantially improved locking action.

A more specific object of the present invention is to provide a novel one-piece fastener member such as a screw or the like which is provided in part with helical thread convolutions of a size which enables them to be readily applied to a complementary threaded member and which is constructed so that after the fastener or screw member has been assembled with the complementary member to a substantial degree, further assembly will result in an aggressive force fit between the elements which will effectively restrain unauthorized retrograde movement of the fastener.

Other objects and advantages of the present invention will become apparent from the following description and the accompanying drawings wherein:

Fig. 1 is an elevational view showing a screw member incorporating the features of the present invention;

Fig. 2 is a partial sectional view showing the novel screw member incorporated in a work assembly;

Fig. 3 is an enlarged fragmentary sectional view taken along line 3—3 in Fig. 2;

Fig. 4 is a fragmentary elevational view showing the condition of the screw member after it has been applied to and then removed from a complementary fastener or nut member;

Fig. 5 is a fragmentary sectional view taken along line 5—5 in Fig. 3;

Fig. 6 is a sectional view taken along line 6—6 in Fig. 1; and

Fig. 7 is a sectional view similar to Fig. 6 but showing a slightly modified form of the present invention.

Referring now more specifically to the drawings wherein like parts are designated by the same numerals throughout the various figures, a screw member 10 incorporating the features of the present invention include an elongated axially extending body or shank portion 12 and a head portion 14 which may be provided with a slot 16 or the like for receiving a screw driver or other suitable tool. The axially extending body or shank 12 comprises an entering end section 18 having a plurality of full helical thread convolutions 20 formed thereon. Another section 22 of the elongated body or shank adjacent the trailing or head end of the screw member is also provided with a plurality of helical thread convolutions 24. The thread convolutions 20 and 24 are preferably provided with substantially equal inside or root diameters and they are also preferably provided with substantially equal outside or crest diameters. It is important to note that the elongated body or shank 12 also includes a third or intermediate section 26 which is unthreaded or, in other words, which has a substantially smooth peripheral surface. The diameter of the section 26 is substantially equal to the initial diameter of the screw blank before the threads are formed on the sections 18 and 22, and, more particularly, the diameter of the section 26 is about midway between the root and crest diameters of the thread convolutions. Thus, the peripheral surface of the section 26 will engage the threads of a complementary fastener or internally threaded member in the manner and for the purpose described more fully below. In order to permit the elongated body or shank to be radially deformed or collapsed as described below upon the application to a complementary threaded member, a slot 28 is formed in the sections 20 and 26 and partially in the section 22. This slot is preferably disposed in a plane parallel to the longitudinal or rotary axis of the screw member and is formed so that it has a curved bottom surface 30 shown best in Fig. 2 which progressively decreases in depth from the entering end of the screw toward the upper end of the slot. In the embodiment shown in Figs. 1-6 the slot 28 is located so that it is bisected by a plane containing the longitudinal axis of the screw. However, if desired, the slot may be offset from the axis of the screw as shown in the embodiment of Fig. 7, which embodiment is otherwise identical to the embodiment of Figs. 1-6 as indicated by the application of identical reference numerals with the suffix "a" added to corresponding elements.

The screw members of this invention are adapted to be assembled with nut members or any other internally threaded elements which have internal helical thread convolutions having root and crest diameters respectively similar to the crest and root diameters of the convolutions 20 and 24. Thus, the entering end section thread convolutions 20 may be easily started into the complementary internally threaded member in the usual manner. One work assembly which includes a novel fastener or screw of the present invention is shown in Fig. 2. This assembly comprises a pair of apertured workpieces 32 and 34 to be retained in assembled relationship, a screw member 10 and a complementary nut member 36. During initial application of the screw member to the nut, the plurality of entering end thread convolutions 20 easily enter the nut and substantially fully engage the thread convolutions 38 of the nut without binding. As relative rotation between the screw and the nut is continued so that the parts are moved into further telescopic relationship, the smooth or unthreaded intermediate section 26 of the elongated body or shank is drawn into the nut. Since, however, the diameter of the smooth shank section 26 is greater than the root diameter of the screw threads and the crest diameter of the internal nut threads, interference is developed between the surface of the section 26 and the nut threads. As the telescoping action continues, the forces developed by this interference cause the shank section 26 to be deformed or collapsed slightly inwardly as shown best in Fig. 5, and small grooves 40 may be impressed into the surface of the shank section 26 by the threads of the nut member as indicated in Figs. 3 and 4. It will be appreciated that the inherent resiliency of the material of the screw shank will cause the surface of the intermediate shank section 26 to be urged and held with great force against the threads of the nut member so as to resist unauthorized retrograde rotation between the parts. Furthermore, portions 42 of the shank section 26 between the impressed grooves 40 will be wedged tightly between the thread convolutions of the nut member for gripping the nut member threads with great force and further restraining unauthorized retrograde movement. It is also to be noted that since the slot 28 decreases in depth toward the trailing end of the section 26, the collapsibility of the section 26 decreases toward its trailing end so that the force developed by the interference fit and the locking action of the section 26 increases toward its trailing end.

While the preferred embodiments of the present invention have been shown and described herein, it is obvious that many structural details may be changed without departing from the spirit and scope of the appended claims. It should also be appreciated that while the complementary nut member 36 shown herein for the purpose of illustrating the present invention has an axial extent only slightly greater than the axial extent of the shank section 26, the screw members may also be readily applied to complementary nut members or other internally threaded members having a greater axial extent so that a considerable portion of the shank section 22 will be telescoped within the internally threaded aperture along with the intermediate section 26. In such an assembly the section 22 permits the screw member to be applied and will provide the screw member with greater holding power without unduly increasing the difficulty of assembling the screw member with the nut member or the like.

The invention is claimed as follows:

1. A self-locking screw device including a shank member comprising a threaded entering section, a normally unthreaded peripheral section of limited axial extent adjacent said entering section, and a trailing threaded section positioned adjacent to and forming a peripheral axial continuation of the opposite side of said unthreaded locking section, the thread convolutions of the entering and trailing sections being dimensionally the same and in helical alignment, and means associated with the free extremity of the trailing section for accommodating a rotary screw driving tool, the diameter of said unthreaded locking section being greater than the root diameter of the threaded sections and less than the external diameter of said threaded sections, said entering and locking sections, and at least a portion of said trailing section adjacent said locking section being longitudinally traversed by a single recess including a radius of the screw extending inwardly from one side to a depth beyond the axis of the screw from the entering end of the screw into the locking section thereof whereby to render shank portions on opposite sides of said recess yieldably collapsible as an incident to the engagement of said unthreaded periphery of the locking section with the crests of thread convolutions in a complementary threaded workpiece aperture when said screw is driven into said threaded work aperture.

2. A self-locking screw device as set forth in claim 1 wherein the crest diameter of the threads on the entering section decrease toward the entering extremity thereof.

3. A self-locking screw device as set forth in claim 1, wherein the recess traverses the axial extent of the entering and locking sections and only a portion of the axial extent of the trailing section.

References Cited in the file of this patent

UNITED STATES PATENTS

| | | |
|---|---|---|
| 191,968 | Ibbotson et al. | June 12, 1877 |
| 1,909,476 | Trotter | May 16, 1933 |
| 1,963,536 | Trotter | June 19, 1934 |
| 2,046,025 | Lee | June 30, 1936 |
| 2,266,758 | Holtz | Dec. 23, 1941 |
| 2,352,540 | Hanneman | June 27, 1944 |
| 2,393,520 | Crowther | Jan. 22, 1946 |
| 2,507,882 | Berman | May 16, 1950 |

FOREIGN PATENTS

| | | |
|---|---|---|
| 1,099,620 | France | Mar. 23, 1955 |